(12) United States Patent
Lai et al.

(10) Patent No.: US 8,760,774 B2
(45) Date of Patent: Jun. 24, 2014

(54) SIX-PIECE OPTICAL LENS SYSTEM

(75) Inventors: Shu-Tzu Lai, Taichung (TW); Chun Sheng Lee, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 210 days.

(21) Appl. No.: 13/399,646

(22) Filed: Feb. 17, 2012

(65) Prior Publication Data

US 2013/0215520 A1 Aug. 22, 2013

(51) Int. Cl.
G02B 13/18 (2006.01)
G02B 9/62 (2006.01)

(52) U.S. Cl.
USPC .......................................... 359/713; 359/757

(58) Field of Classification Search
USPC ................. 359/713–715, 756–757, 763–764, 359/771–772
See application file for complete search history.

(56) References Cited

U.S. PATENT DOCUMENTS

| | | | |
|---|---|---|---|
| 2012/0188654 A1* | 7/2012 | Huang | 359/713 |
| 2012/0194726 A1* | 8/2012 | Huang et al. | 348/340 |
| 2013/0003193 A1* | 1/2013 | Huang | 359/713 |
| 2013/0033762 A1* | 2/2013 | Tsai et al. | 359/713 |

* cited by examiner

Primary Examiner — Jordan Schwartz
(74) Attorney, Agent, or Firm — Banger Shia

(57) ABSTRACT

A six-piece optical lens system comprises, in order from the object side to the image side: a stop, a first lens element with a positive refractive power having a convex object-side surface and at least one aspheric surface; a second lens element with a negative refractive power having a concave image-side surface and at least one aspheric surface; a third lens element with a positive refractive power having a convex image-side surface and at least one aspheric surface; a fourth lens element with a positive refractive power having a concave object-side surface and at least one aspheric surface; a fifth lens element having a convex image-side surface and at least one aspheric surface; a sixth lens element with a negative refractive power having a concave image-side surface and at least one aspheric surface. Thereby, the total track length of the system will not be too long.

10 Claims, 4 Drawing Sheets

SIX-PIECE OPTICAL LENS SYSTEM

BACKGROUND OF THE INVENTION

1. Field of the Invention

The present invention relates to an optical lens system, and more particularly to a six-piece optical lens system.

2. Description of the Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems used in portable electronic products mostly consist of four lens elements, however, the resolution of the mobile phone camera has been improved rapidly. As the pixel size of electronic imaging sensors gradually becomes smaller and smaller, the system requires higher image quality, and miniaturization and high performance have become the trend of modern electronic products. The conventional optical lens system comprising four lens elements cannot satisfy the requirements of higher resolution optical lens systems.

The present invention mitigates and/or obviates the aforementioned disadvantages.

SUMMARY OF THE INVENTION

The primary objective of the present invention is to provide a six-piece optical lens system without having an excessively long total track length, the six-piece optical lens system not only can be applied to a high resolution mobile phone, but also has a wide field of view, big stop, high pixel, high resolution and low height.

A six-piece optical lens system in accordance with the present invention comprises, in order from the object side to the image side: a stop; a first lens element with a positive refractive power having a convex object-side surface, at least one of the object-side and an image-side surfaces of the first lens element being aspheric; a second lens element with a negative refractive power having a concave image-side surface, at least one of an object-side and the image-side surfaces of the second lens element being aspheric; a third lens element with a positive refractive power having a convex image-side surface, at least one of an object-side and the image-side surfaces of the third lens element being aspheric; a fourth lens element with a positive refractive power having a concave object-side surface, at least one of the object-side and an image-side surfaces of the fourth lens element being aspheric; a fifth lens element having a convex image-side surface, at least one of an object-side and the image-side surfaces of the fifth lens element being aspheric; and a sixth lens element with a negative refractive power having a concave image-side surface, at least one of an object-side and the image-side surfaces of the second lens element being aspheric.

According to one aspect of the present six-piece optical lens system, the focal length of the first lens element is f1, the focal length of the second lens element is f2, and they satisfy the relation: $0.3 < |f1|/|f2| < 0.7$. If $|f1|/|f2|$ satisfies the above relation, a wide field of view, big stop, high pixel and low height can be provided and the resolution can be improved evidently. Contrarily, If $|f1|/|f2|$ exceeds the above range, the performance and resolution of the optical lens system with a wide field of view will be reduced, and the yield rate will be low.

According to another aspect of the present six-piece optical lens system, the focal length of the second lens element is f2, the focal length of the third lens element is f3, and they satisfy the relation: $0.7 < |f2|/|f3| < 1.4$. If $|f2|/|f3|$ satisfies the above relation, a wide field of view, big stop, high pixel and low height can be provided and the resolution can be improved evidently. Contrarily, If $|f2|/|f3|$ exceeds the above range, the performance and resolution of the optical lens system with a wide field of view will be reduced, and the yield rate will be low.

According to another aspect of the present six-piece optical lens system, the focal length of the fifth lens element is f5, the focal length of the sixth lens element is f6, and they satisfy the relation: $2.2 < |f5|/|f6| < 4.2$. If $|f5|/|f6|$ satisfies the above relation, a wide field of view, big stop, high pixel and low height can be provided and the resolution can be improved evidently. Contrarily, If $|f5|/|f6|$ exceeds the above range, the performance and resolution of the optical lens system with a wide field of view will be reduced, and the yield rate will be low.

According to another aspect of the present six-piece optical lens system, the focal length of the first lens element, the second lens element and the third lens element combined is f123, the focal length of the six-piece optical lens system is f, and they satisfy the relation: $0.6 < |f123|/|f| < 1.2$. If $|f123|/|f|$ satisfies the above relation, a wide field of view, big stop, high pixel and low height can be provided and the resolution can be improved evidently. Contrarily, If $|f123|/|f|$ exceeds the above range, the performance and resolution of the optical lens system with a wide field of view will be reduced, and the yield rate will be low.

According to another aspect of the present six-piece optical lens system, the focal length of the fourth lens element, the fifth lens element and the sixth lens element combined is f456, the focal length of the six-piece optical lens system is f, and they satisfy the relation: $0.8 < |f456|/|f| < 2.7$. If $|f456|/|f|$ satisfies the above relation, a wide field of view, big stop, high pixel and low height can be provided and the resolution can be improved evidently. Contrarily, If $|f456|/|f|$ exceeds the above range, the performance and resolution of the optical lens system with a wide field of view will be reduced, and the yield rate will be low.

According to another aspect of the present six-piece optical lens system, the focal length of the first lens element is f1, the focal length of the second lens element and the third lens element combined is f23, and they satisfy the relation: $|f1|/|f23| < 0.25$. If $|f1|/|f23|$ satisfies the above relation, a wide field of view, big stop, high pixel and low height can be provided and the resolution can be improved evidently. Contrarily, If $|f1|/|f23|$ exceeds the above range, the performance and resolution of the optical lens system with a wide field of view will be reduced, and the yield rate will be low.

According to another aspect of the present six-piece optical lens system, the focal length of the third lens element and the fourth lens element combined is f34, the focal length of the fifth lens element and the sixth lens element combined is f56, and they satisfy the relation: $0.55 < |f34|/|f56| < 1.25$. If $|f34|/|f56|$ satisfies the above relation, a wide field of view, big stop, high pixel and low height can be provided and the resolution can be improved evidently. Contrarily, If $|f34|/|f56|$ exceeds the above range, the performance and resolution of the optical lens system with a wide field of view will be reduced, and the yield rate will be low.

According to another aspect of the present six-piece optical lens system, the focal length of the six-piece optical lens system is f, the distance between the object-side surface of the first lens element and the image plane is TL, and they satisfy the relation: 0.5<|f/TL|<0.9. If |f/TL| satisfies the above relation, the total track length of the optical lens system can be relatively short, and the requirement of miniaturization can be satisfied.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
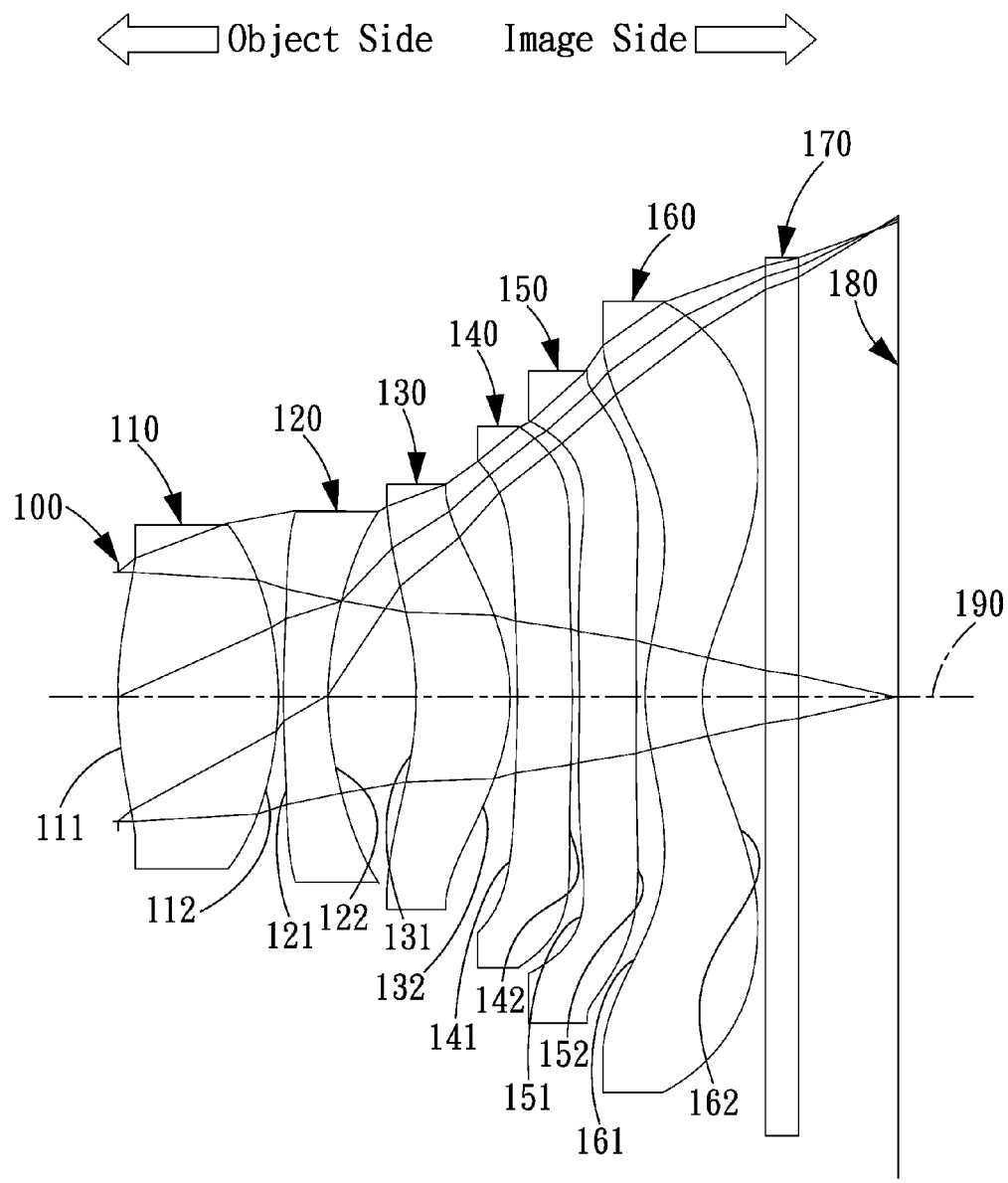
FIG. 1A shows an optical lens system in accordance with a first embodiment of the present invention.
Figure 1B:
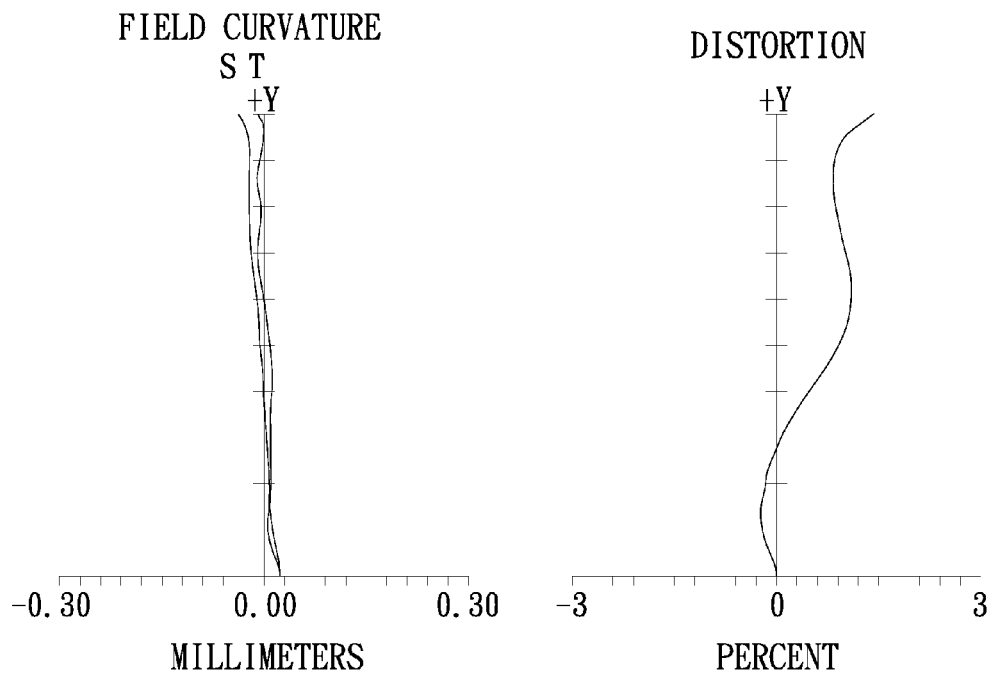
FIG. 1B shows the longitudinal spherical aberration curve, the astigmatic field curve, and the distortion curve of the first embodiment of the present invention.
Figure 1B:
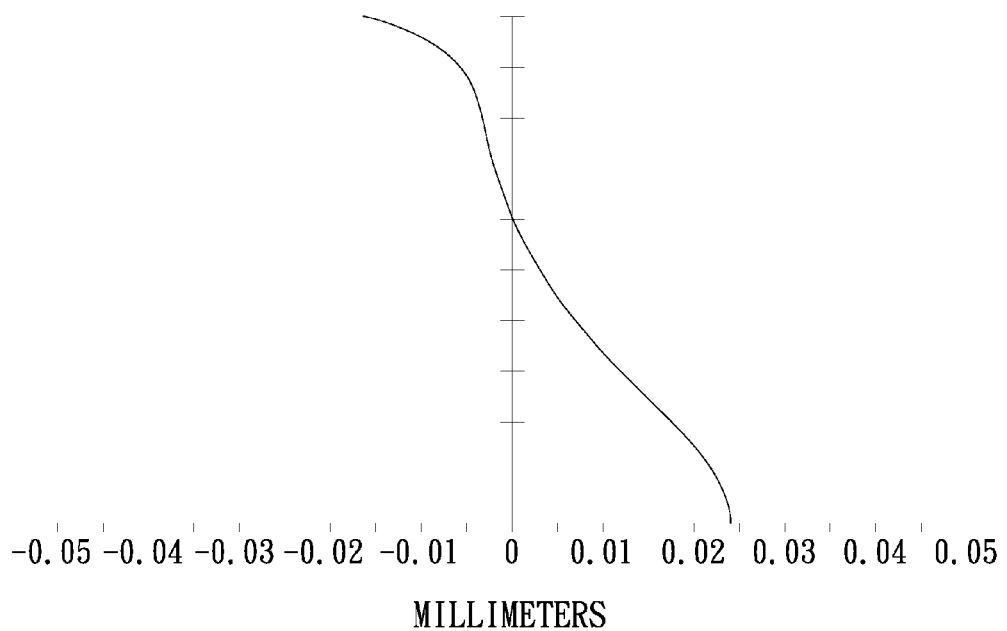

Referring to FIG. 1A, which shows a six-piece optical lens system in accordance with a first embodiment of the present invention, and FIG. 1B shows the longitudinal spherical aberration curves, the astigmatic field curves, and the distortion curve of the first embodiment of the present invention. A six-piece optical lens system in accordance with the first embodiment of the present invention comprises, in order from the object side A to the image side B:

A stop 100.

A first lens element 110 with a positive refractive power made of plastic has a convex object-side surface 111 and a convex image-side surface 112, and the object-side surface 111 and the image-side surface 112 of the first lens element 110 are aspheric.

A second lens element 120 with a negative refractive power made of plastic has a convex object-side surface 121 and a concave image-side surface 122, and the object-side surface 121 and the image-side surface 122 of the second lens element 120 are aspheric.

A third lens element 130 with a positive refractive power made of plastic has a concave object-side surface 131 and a convex image-side surface 132, and the object-side surface 131 and the image-side surface 132 of the third lens element 130 are aspheric.

A fourth lens element 140 with a positive refractive power made of plastic has a concave object-side surface 141 and a convex image-side surface 142, and the object-side surface 141 and the image-side surface 142 of the fourth lens element 140 are aspheric.

A fifth lens element 150 with a negative refractive power made of plastic has a concave object-side surface 151 and a convex image-side surface 152, and the object-side surface 151 and the image-side surface 152 of the fifth lens element 150 are aspheric.

A sixth lens element 160 with a negative refractive power made of plastic has a convex object-side surface 161 and a concave image-side surface 162, and the object-side surface 161 and the image-side surface 162 of the sixth lens element 160 are aspheric.

An IR cut filter 170 made of glass is located between the image-side surface 162 of the sixth lens element 160 and an image plane 180 and has no influence on the focal length of the six-piece optical lens system.

The equation for the aspheric surface profiles of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

k represents the conic constant;

c represents the reciprocal of the radius of curvature;

A, B, C, D, E, G, . . . : represent the high-order aspheric coefficients. In the first embodiment of the present six-piece optical lens system, the focal length of the six-piece optical lens system is f, and it satisfies the relation:

f=3.7.

In the first embodiment of the present six-piece optical lens system, the f-number of the six-piece optical lens system is Fno, and it satisfies the relation:

Fno=2.2.

In the first embodiment of the present six-piece optical lens system, the field of view of the six-piece optical lens system is 2ω, and it satisfies the relation:

2ω=78°.

In the first embodiment of the present six-piece optical lens system, the focal length of the first lens element 110 is f1, the focal length of the second lens element 120 is f2, and they satisfy the relation:

|f1|/|f2|=0.534.

In the first embodiment of the present six-piece optical lens system, the focal length of the second lens element 120 is f2, the focal length of the third lens element 130 is f3, and they satisfy the relation:

|f2|/|f3|=1.013.

In the first embodiment of the present six-piece optical lens system, the focal length of the fifth lens element 150 is f5, the focal length of the sixth lens element 160 is f6, and they satisfy the relation:

|f5|/|f6|=2.719.

In the first embodiment of the present six-piece optical lens system, the focal length of the first lens element 110, the second lens element 120 and the third lens element 130 combined is f123, the focal length of the six-piece optical lens system is f, and they satisfy the relation:

|f123|/|f|=0.824.

In the first embodiment of the present six-piece optical lens system, the focal length of the fourth lens element 140, the fifth lens element 150 and the sixth lens element 160 combined is f456, the focal length of the six-piece optical lens system is f, and they satisfy the relation:

|f456|/|f|=1.117.

In the first embodiment of the present six-piece optical lens system, the focal length of the first lens element 110 is f1, the focal length of the second lens element 120 and the third lens element 130 combined is f23, and they satisfy the relation:

|f1|/|f23|=0.148.

In the first embodiment of the present six-piece optical lens system, the focal length of the third lens element 130 and the fourth lens element 140 combined is f34, the focal length of the fifth lens element 150 and the sixth lens element 160 combined is f56, and they satisfy the relation:

|f34|/|f56|=0.731.

In the first embodiment of the present six-piece optical lens system, the focal length of the six-piece optical lens system is f, the distance between the object-side surface 111 of the first lens element 110 and the image plane 180 is TL, and they satisfy the relation:

|f/TL|=0.746.

The detailed optical data of the first embodiment is shown in table 1, and the aspheric surface data is shown in table 2, wherein the units of the radius of curvature, the thickness and the focal length are expressed in mm. In the tables 1 and 2, the surfaces 2 and 3 represent the object-side surface 111 and the image-side surface 112 of the first lens element 110, respectively, the surfaces 4 and 5 represent the object-side surface 121 and the image-side surface 122 of the second lens element 120, respectively, the surfaces 6 and 7 represent the object-side surface 131 and the image-side surface 132 of the third lens element 130, respectively, the surfaces 8 and 9 represent the object-side surface 141 and the image-side surface 142 of the fourth lens element 140, respectively, the surfaces 10 and 11 represent the object-side surface 151 and the image-side surface 152 of the fifth lens element 150, respectively, and the surfaces 12 and 13 represent the object-side surface 161 and the image-side surface 162 of the sixth lens element 160, respectively.

TABLE 1

(Embodiment 1)
f(focal length) = 3.7 mm, Fno = 2.2, 2ω = 78°.

| Surface # | | Curvature Radius | Thickness | Material | nd | vd |
|---|---|---|---|---|---|---|
| 0 | Object | Infinity | Infinity | | | |
| 1 | Stop | Infinity | 0 | | | |
| 2 | Lens 1 | 2.727356(ASP) | 1.020563 | Plastic | 1.535 | 56 |
| 3 | | −2.39709(ASP) | 0.033509 | | | |
| 4 | Lens 2 | 6.291252(ASP) | 0.284535 | Plastic | 1.632 | 23 |
| 5 | | 2.019302(ASP) | 0.559112 | | | |
| 6 | Lens 3 | −2.13611(ASP) | 0.559915 | Plastic | 1.535 | 56 |
| 7 | | −1.27359(ASP) | 0.045719 | | | |
| 8 | Lens 4 | −9.10148(ASP) | 0.350307 | Plastic | 1.632 | 23 |
| 9 | | −7.13464(ASP) | 0.044464 | | | |
| 10 | Lens 5 | −8.1211(ASP) | 0.363832 | Plastic | 1.632 | 23 |
| 11 | | −55.1138(ASP) | 0.055516 | | | |
| 12 | Lens 6 | 1.282083(ASP) | 0.364208 | Plastic | 1.535 | 56 |
| 13 | | 0.805485(ASP) | 0.40108 | | | |
| 14 | IR-filter | Infinity | 0.21 | Glass | 1.5168 | 64.167336 |
| 15 | | Infinity | 0.636486 | | | |
| 16 | Image | Infinity | | | | |

TABLE 2

Aspheric Coefficients

| | Surface # | | | | | |
|---|---|---|---|---|---|---|
| | 2 | 3 | 4 | 5 | 6 | 7 |
| K = | −3.66518 | 1.170447 | 22.1401 | −3.51263 | −4.82793 | −1.04996 |
| A = | −0.01185 | −0.03666 | −0.12494 | −0.03091 | 0.002018 | 0.079536 |
| B = | −0.02287 | 0.045467 | 0.071545 | 0.026771 | 0.062409 | −0.02278 |
| C = | −0.01498 | −0.02838 | 0.007893 | 0.006612 | −0.03286 | 0.020347 |
| D = | 7.62E−05 | 0.001097 | −0.01134 | −0.00175 | 0.006367 | −0.00275 |
| E = | 0 | 0 | 0 | 0 | 0 | 0 |

| | Surface # | | | | | |
|---|---|---|---|---|---|---|
| | 8 | 9 | 10 | 11 | 12 | 13 |
| K = | −314.567 | −218.232 | −1400.2 | 695.7252 | −12.84 | −4.53992 |
| A = | 0.01102 | 0.044387 | 0.06162 | 0.036991 | −0.0826 | −0.07441 |
| B = | −0.01839 | −0.01196 | −0.02116 | −0.01836 | 0.002488 | 0.014352 |
| C = | 4.62E−04 | −0.00671 | −0.00189 | −0.00106 | 0.003064 | −0.00145 |
| D = | −8.11E−04 | 8.22E−04 | −2.36E−04 | 5.88E−04 | −3.13E−04 | 2.94E−05 |
| E = | 0 | 0 | 0 | 695.7252 | 0 | 0 |

Figure 2A:
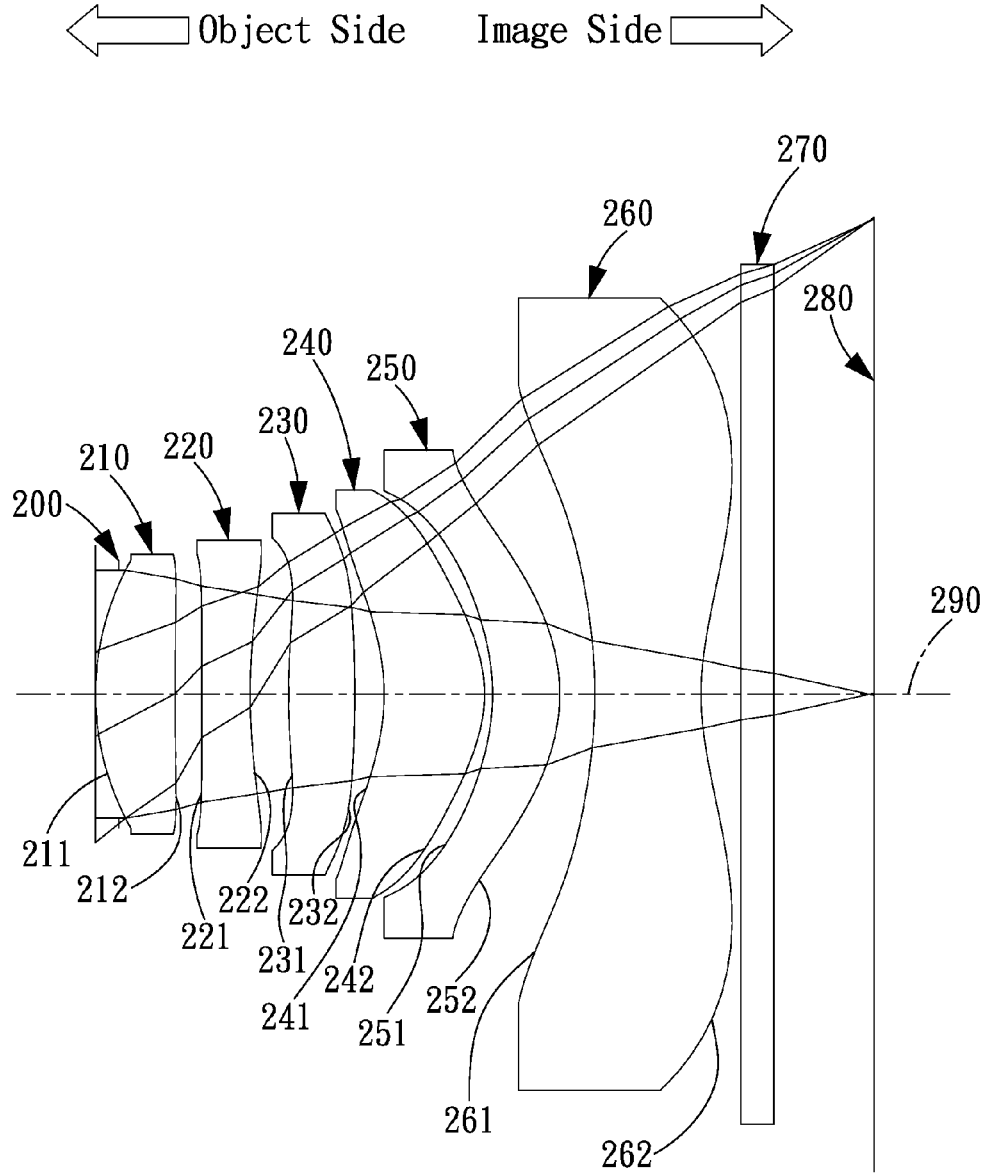
FIG. 2A shows an optical lens system in accordance with a second embodiment of the present invention.
Figure 2B:
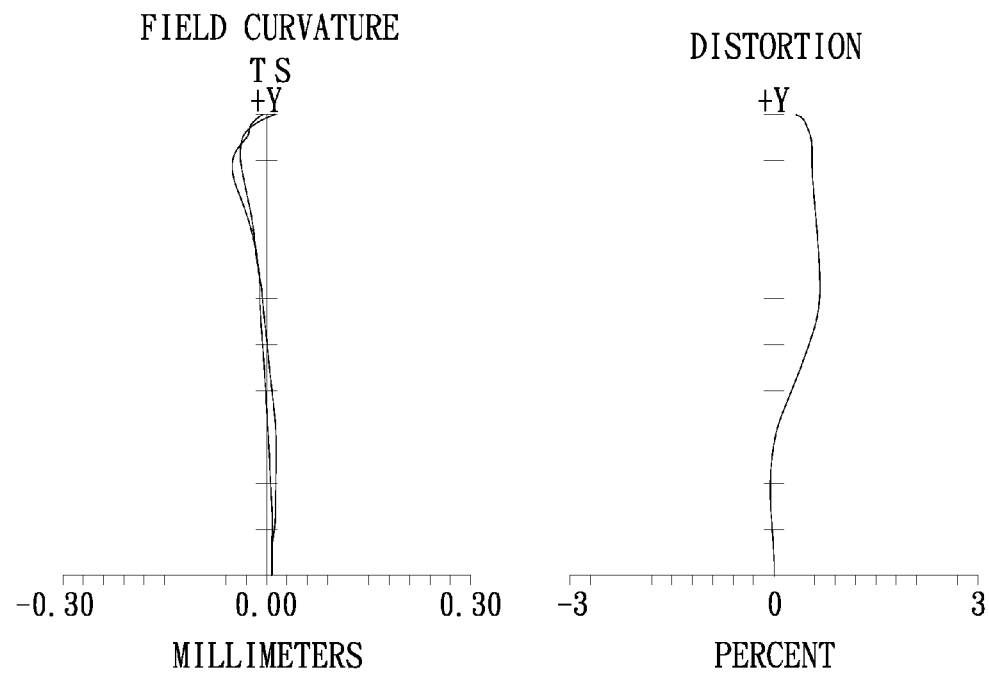
FIG. 2B shows the longitudinal spherical aberration curve, the astigmatic field curve, and the distortion curve of the second embodiment of the present invention.
Figure 2B:
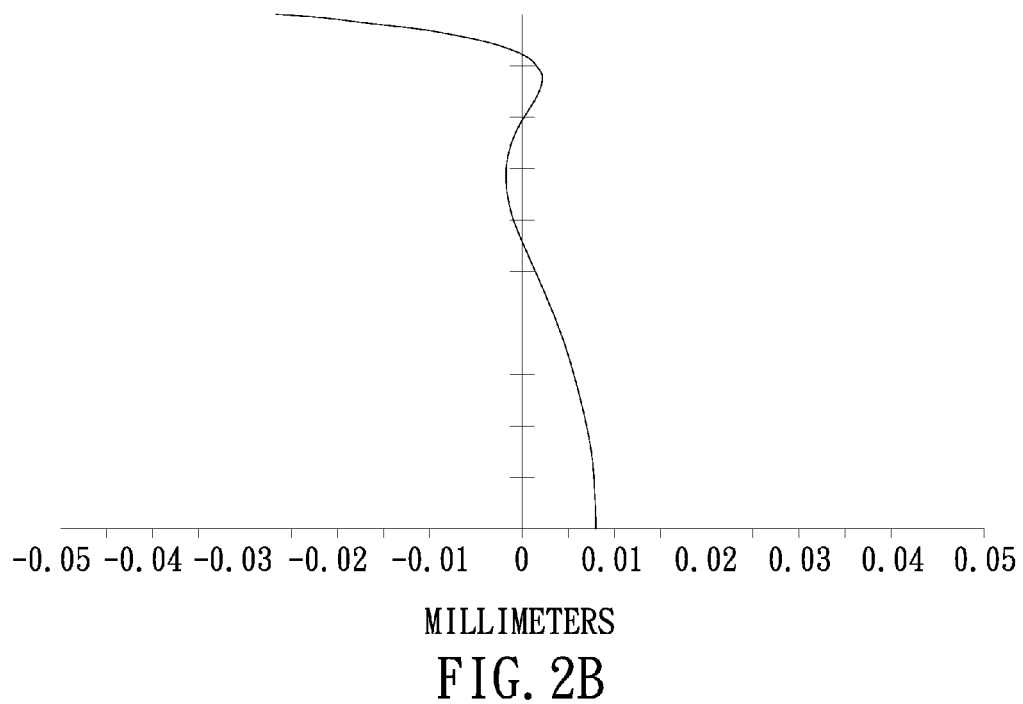

Referring to FIG. 2A, which shows a six-piece optical lens system in accordance with a second embodiment of the present invention, and FIG. 2B shows the longitudinal spherical aberration curves, the astigmatic field curves, and the distortion curve of the second embodiment of the present invention. A six-piece optical lens system in accordance with the second embodiment of the present invention comprises, in order from the object side A to the image side B:

A stop 200.

A first lens element 210 with a positive refractive power made of plastic has a convex object-side surface 211 and a convex image-side surface 212, and the object-side surface 211 and the image-side surface 212 of the first lens element 210 are aspheric.

A second lens element 220 with a negative refractive power made of plastic has a convex object-side surface 221 and a concave image-side surface 222, and the object-side surface 221 and the image-side surface 222 of the second lens element 220 are aspheric.

A third lens element 230 with a positive refractive power made of plastic has a convex object-side surface 231 and a convex image-side surface 232, and the object-side surface 231 and the image-side surface 232 of the third lens element 230 are aspheric.

A fourth lens element 240 with a positive refractive power made of plastic has a concave object-side surface 241 and a convex image-side surface 242, and the object-side surface 241 and the image-side surface 242 of the fourth lens element 240 are aspheric.

A fifth lens element 250 with a positive refractive power made of plastic has a concave object-side surface 251 and a convex image-side surface 252, and the object-side surface 251 and the image-side surface 252 of the fifth lens element 250 are aspheric.

A sixth lens element 260 with a negative refractive power made of plastic has a concave object-side surface 261 and a concave image-side surface 262, and the object-side surface 261 and the image-side surface 262 of the sixth lens element 260 are aspheric.

An IR cut filter 270 made of glass is located between the image-side surface 262 of the sixth lens element 260 and an image plane 280 and has no influence on the focal length of the six-piece optical lens system.

The equation for the aspheric surface profiles of the second embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 290;

k represents the conic constant;

c represents the reciprocal of the radius of curvature;

A, B, C, D, E, G, . . . : represent the high-order aspheric coefficients.

In the second embodiment of the present six-piece optical lens system, the focal length of the six-piece optical lens system is f, and it satisfies the relation:

f=3.55.

In the second embodiment of the present six-piece optical lens system, the f-number of the six-piece optical lens system is Fno, and it satisfies the relation:

Fno=2.2.

In the second embodiment of the present six-piece optical lens system, the field of view of the six-piece optical lens system is 2ω, and it satisfies the relation:

2ω=78°.

In the second embodiment of the present six-piece optical lens system, the focal length of the first lens element 210 is f1, the focal length of the second lens element 220 is f2, and they satisfy the relation:

|f1|/|f2|=0.523.

In the second embodiment of the present six-piece optical lens system, the focal length of the second lens element 220 is f2, the focal length of the third lens element 230 is f3, and they satisfy the relation:

|f2|/|f3|=1.133.

In the second embodiment of the present six-piece optical lens system, the focal length of the fifth lens element 250 is f5, the focal length of the sixth lens element 260 is f6, and they satisfy the relation:

|f5|/|f6|=3.705.

In the second embodiment of the present six-piece optical lens system, the focal length of the first lens element 210, the second lens element 220 and the third lens element 230 combined is f123, the focal length of the six-piece optical lens system is f, and they satisfy the relation:

|f123|/|f|=0.911.

In the second embodiment of the present six-piece optical lens system, the focal length of the fourth lens element 240, the fifth lens element 250 and the sixth lens element 260 combined is f456, the focal length of the six-piece optical lens system is f, and they satisfy the relation:

|f456|/|f|=2.41.

In the second embodiment of the present six-piece optical lens system, the focal length of the first lens element 210 is f1, the focal length of the second lens element 220 and the third lens element 230 combined is f23, and they satisfy the relation:

|f1|/|f23|=0.098.

In the second embodiment of the present six-piece optical lens system, the focal length of the third lens element 230 and the fourth lens element 240 combined is f34, the focal length of the fifth lens element 250 and the sixth lens element 260 combined is f56, and they satisfy the relation:

|f34|/|f56|=1.048.

In the second embodiment of the present six-piece optical lens system, the focal length of the six-piece optical lens system is f, the distance between the object-side surface 211 of the first lens element 210 and the image plane 280 is TL, and they satisfy the relation:

|f/TL|=0.724.

The detailed optical data of the second embodiment is shown in table 3, and the aspheric surface data is shown in table 4, wherein the units of the radius of curvature, the thickness and the focal length are expressed in mm. In the tables 3 and 4, the surfaces 2 and 3 represent the object-side surface 211 and the image-side surface 212 of the first lens element 210, respectively, the surfaces 4 and 5 represent the object-side surface 221 and the image-side surface 222 of the second lens element 220, respectively, the surfaces 6 and 7 represent the object-side surface 231 and the image-side surface 232 of the third lens element 230, respectively, the surfaces 8 and 9 represent the object-side surface 241 and the image-side surface 242 of the fourth lens element 240, respectively, the surfaces 10 and 11 represent the object-side surface 251 and the image-side surface 252 of the fifth lens element 250, respectively, and the surfaces 12 and 13 represent the object-side surface 261 and the image-side surface 262 of the sixth lens element 260, respectively.

TABLE 3

(Embodiment 2)
f(focal length) = 3.55 mm, Fno = 2.2, 2ω = 78°.

| Surface # | | Curvature Radius | Thickness | Material | nd | vd |
|---|---|---|---|---|---|---|
| 0 | Object | Infinity | Infinity | | | |
| 1 | Stop | Infinity | −0.145113 | | | |
| 2 | Lens 1 | 1.725997(ASP) | 0.502592 | Plastic | 1.535 | 56 |
| 3 | | 52.07841(ASP) | 0.167793 | | | |
| 4 | Lens 2 | 62.69386(ASP) | 0.304816 | Plastic | 1.632 | 23 |
| 5 | | 3.787161(ASP) | 0.241563 | | | |
| 6 | Lens 3 | 4.049737(ASP) | 0.417269 | Plastic | 1.535 | 56 |
| 7 | | −11.1579(ASP) | 0.186139 | | | |
| 8 | Lens 4 | −1.40812(ASP) | 0.633747 | Plastic | 1.535 | 56 |
| 9 | | −0.88853(ASP) | 0.05 | | | |
| 10 | Lens 5 | −1.43565(ASP) | 0.42337 | Plastic | 1.632 | 23 |
| 11 | | −1.18046(ASP) | 0.221961 | | | |
| 12 | Lens 6 | −3.31708(ASP) | 0.668963 | Plastic | 1.632 | 23 |
| 13 | | 1.747659(ASP) | 0.248998 | | | |
| 14 | IR-filter | Infinity | 0.21 | Glass | 1.5168 | 64.167336 |
| 15 | | Infinity | 0.633285 | | | |
| 16 | Image | Infinity | | | | |

TABLE 4

Aspheric Coefficients

| | | | Surface # | | | |
|---|---|---|---|---|---|---|
| | 2 | 3 | 4 | 5 | 6 | 7 |
| K = | 0.292541 | 43.63969 | −1.22E+20 | −35.5593 | −29.4553 | 45.84689 |
| A = | −0.00341 | 0.019718 | −1.92E−04 | 0.023065 | −0.07194 | −0.02697 |
| B = | 0.010954 | −0.02647 | −0.02489 | −0.01811 | −0.07061 | −0.04616 |
| C = | −0.01216 | −0.01766 | −0.01927 | −0.02093 | −0.04099 | −0.00848 |
| D = | −0.02443 | −0.0166 | −0.02282 | −0.01699 | −0.01992 | 0.00252 |
| E = | 0.007944 | −0.0282 | −0.01429 | 0.003573 | −0.00432 | 0.008792 |

| | | | Surface # | | | |
|---|---|---|---|---|---|---|
| | 8 | 9 | 10 | 11 | 12 | 13 |
| K = | −1.93476 | −2.5939 | −2.31552 | −1.12867 | −20.303 | −10.2154 |
| A = | 0.048426 | 0.042978 | −0.00432 | 0.009482 | −0.02439 | −0.03748 |
| B = | 0.028966 | −0.00839 | −0.01547 | 0.008241 | −0.00429 | 0.005602 |
| C = | 0.009371 | −0.00765 | 0.00292 | 0.005813 | 0.002123 | −9.18E−04 |
| D = | −0.00241 | −0.00704 | −0.00288 | −2.00E−04 | 1.95E−04 | 8.48E−05 |
| E = | −0.00975 | −0.00182 | −0.00594 | −2.97E−04 | −6.18E−05 | −3.76E−06 |

TABLE 5

| | Embodiment 1 | Embodiment 2 |
|---|---|---|
| f | 3.7 | 3.55 |
| Fno | 2.2 | 2.2 |
| 2ω | 78 | 78 |
| \|f1\|/\|f2\| | 0.534 | 0.523 |
| \|f2\|/\|f3\| | 1.013 | 1.133 |
| \|f5\|/\|f6\| | 2.719 | 3.705 |
| \|f123\|/\|f\| | 0.824 | 0.911 |
| \|f456\|/\|f\| | 1.117 | 2.41 |
| \|f1\|/\|f23\| | 0.148 | 0.098 |
| \|f34\|/\|f56\| | 0.731 | 1.048 |
| \|f/TL\| | 0.746 | 0.724 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

In the present six-piece optical lens system, the lens elements can be made of glass or plastic. If the lens elements are made of glass, there is more freedom in distributing the refractive power of the six-piece optical lens system. If the lens elements are made of plastic, the cost will be effectively reduced.

As used throughout the specification and the claims, in the present six-piece optical lens system, if the object-side or the image-side surface of the lens elements is convex, the object-side or the image-side surface of the lens elements at a position on the lens surface that intersects the optical axis is convex. If the object-side or the image-side surface of the lens elements is concave, the object-side or the image-side surface of the lens elements at a position on the lens surface that intersects the optical axis is concave.

While we have shown and described various embodiments in accordance with the present invention, it should be clear to those skilled in the art that further embodiments may be made without departing from the scope of the present invention.

What is claimed is:

1. A six-piece optical lens system comprising, in order from an object side to an image side:
   a stop;
   a first lens element with a positive refractive power having a convex object-side surface, at least one of the object-side and an image-side surfaces of the first lens element being aspheric;
   a second lens element with a negative refractive power having a concave image-side surface, at least one of an object-side and the image-side surfaces of the second lens element being aspheric;
   a third lens element with a positive refractive power having a convex image-side surface, at least one of an object-side and the image-side surfaces of the third lens element being aspheric;
   a fourth lens element with a positive refractive power having a concave object-side surface, at least one of the object-side and an image-side surfaces of the fourth lens element being aspheric;
   a fifth lens element having a convex image-side surface, at least one of an object-side and the image-side surfaces of the fifth lens element being aspheric; and
   a sixth lens element with a negative refractive power having a concave image-side surface, at least one of an object-side and the image-side surfaces of the sixth lens element being aspheric;
   wherein the first lens element, second lens element, third lens element, fourth lens element, fifth lens element, sixth lens element are the only lens elements with refractive power within the lens system;
   a focal length of the second lens element is f2, a focal length of the third lens element is f3, and they satisfy the relation:
   $0.7<|f2|/|f3|<1.4$.

2. The six-piece optical lens system as claimed in claim 1, wherein a focal length of the first lens element is f1, a focal length of the second lens element is f2, and they satisfy the relation:
   $0.3<|f1|/|f2|<0.7$.

3. The six-piece optical lens system as claimed in claim 1, wherein a focal length of the fifth lens element is f5, a focal length of the sixth lens element is f6, and they satisfy the relation:
   $2.2<|f5|/|f6|<4.2$.

4. The six-piece optical lens system as claimed in claim 1, wherein a focal length of the first lens element, the second lens element and the third lens element combined is f123, a focal length of the six-piece optical lens system is f, and they satisfy the relation:
   $0.6<|f123|/|f|<1.2$.

5. The six-piece optical lens system as claimed in claim 1, wherein a focal length of the fourth lens element, the fifth lens element and the sixth lens element combined is f456, a focal length of the six-piece optical lens system is f, and they satisfy the relation:
   $0.8<|f456|/|f|<2.7$.

6. The six-piece optical lens system as claimed in claim 1, wherein a focal length of the first lens element is f1, a focal length of the second lens element and the third lens element combined is f23, and they satisfy the relation:
   $|f1|/|f23|<0.25$.

7. The six-piece optical lens system as claimed in claim 1, wherein a focal length of the third lens element and the fourth lens element combined is f34, a focal length of the fifth lens element and the sixth lens element combined is f56, and they satisfy the relation:
   $0.55<|f34|/|f56|<1.25$.

8. The six-piece optical lens system as claimed in claim 1, wherein a focal length of the six-piece optical lens system is f, a distance between the object-side surface of the first lens element and an image plane is TL, and they satisfy the relation:
   $0.5<|f/TL|<0.9$.

9. The six-piece optical lens system as claimed in claim 1, wherein the first, second, third, fourth, fifth and sixth lens elements are made of plastic, the image-side surface of the first lens element is convex, the object-side surface and the image-side surface of the first lens element are aspheric, the object-side surface of the second lens element is convex, the object-side surface and the image-side surface of the second lens element are aspheric, the object-side surface of the third lens element is concave, the object-side surface and the image-side surface of the third lens element are aspheric, the image-side surface of the fourth lens element is convex, the object-side surface and the image-side surface of the fourth lens element are aspheric, the refractive power of the fifth lens element is negative, the object-side surface of the fifth lens element is concave, the object-side surface and the image-side surface of the fifth lens element are aspheric, the object-side surface of the sixth lens element is convex, and the object-side surface and the image-side surface of the sixth lens element are aspheric.

10. The six-piece optical lens system as claimed in claim 1, wherein the first, second, third, fourth, fifth and sixth lens elements are made of plastic, the image-side surface of the first lens element is convex, the object-side surface and the image-side surface of the first lens element are aspheric, the object-side surface of the second lens element is convex, the object-side surface and the image-side surface of the second lens element are aspheric, the object-side surface of the third lens element is convex, the object-side surface and the image-side surface of the third lens element are aspheric, the image-side surface of the fourth lens element is convex, the object-side surface and the image-side surface of the fourth lens element are aspheric, the refractive power of the fifth lens element is positive, the object-side surface of the fifth lens element is concave, the object-side surface and the image-side surface of the fifth lens element are aspheric, the object-side surface of the sixth lens element is concave, and the object-side surface and the image-side surface of the sixth lens element are aspheric.

* * * * *